United States Patent
Horton et al.

(10) Patent No.: US 6,746,528 B1
(45) Date of Patent: Jun. 8, 2004

(54) HIGH TEMPERATURE INVESTMENT MATERIAL AND METHOD FOR MAKING SOLID INVESTMENT MOLDS

(75) Inventors: Robert A. Horton, Chesterland, OH (US); Claude H. Watts, Hudson, OH (US)

(73) Assignee: Precision Metalsmiths, Inc., Cleveland, OH (US)

( * ) Notice: Subject to any disclaimer, the term of this patent is extended or adjusted under 35 U.S.C. 154(b) by 0 days.

(21) Appl. No.: 10/422,154

(22) Filed: Apr. 24, 2003

(51) Int. Cl.$^7$ .............................. B28B 7/36; C04B 35/66
(52) U.S. Cl. ................ 106/38.2; 106/38.22; 106/38.27; 106/38.9; 164/15; 164/520; 164/528; 164/529
(58) Field of Search ............................ 106/38.2, 38.22, 106/38.27, 38.9, 692, 693; 164/15, 520, 528, 529

(56) References Cited

U.S. PATENT DOCUMENTS

| | | | |
|---|---|---|---|
| 2,072,212 A | | 3/1937 | Moosdorf et al. |
| 2,099,367 A | | 11/1937 | Lefranc |
| 2,152,152 A | | 3/1939 | Prosen |
| 2,209,035 A | | 7/1940 | Prosen |
| 2,479,504 A | | 8/1949 | Moore et al. |
| 2,680,890 A | | 6/1954 | Moore et al. |
| 2,681,860 A | | 6/1954 | Rhodes et al. |
| 2,928,749 A | | 3/1960 | Watts |
| 3,114,948 A | | 12/1963 | Poe |
| 4,089,692 A | * | 5/1978 | Toeniskoetter et al. .. 106/38.35 |
| 5,073,525 A | * | 12/1991 | Cheng et al. .................. 501/81 |
| 5,302,563 A | * | 4/1994 | Rumpeltin et al. ......... 501/111 |

* cited by examiner

*Primary Examiner*—Michael Marcheschi
(74) *Attorney, Agent, or Firm*—Pearne & Gordon LLP

(57) ABSTRACT

An improved phosphate-type refractory investment material and method for marking solid investment molds especially useful for casting high melting point metals and alloys, such as platinum and the like. The material consists essentially of one or more phosphate salts, one or more water soluble organic acids, and refractory powder. The material can be prepared as a dry powder blend which is easily shipped to the user and mixed with water at the time of investing the flask. Alternatively, the salt and/or organic acid can be combined with the refractory powder at the time of mixing with water.

17 Claims, No Drawings

HIGH TEMPERATURE INVESTMENT MATERIAL AND METHOD FOR MAKING SOLID INVESTMENT MOLDS

FIELD OF THE INVENTION

The present invention relates generally to the investment casting art, and more specifically to solid investment mold materials and methods especially useful for casting high melting point metals, such as platinum and the like.

BACKGROUND OF THE INVENTION

As will be understood by those familiar with the investment casting art, the general procedure for making solid investment molds involves attaching patterns having configurations of the desired metal castings to a runner system to form a set-up or "tree". The patterns and runner system are made of wax, plastic or other expendable material. To form the mold, the set-up or tree consisting of the pattern or patterns attached to the runner system are placed into a flask which is filled with a refractory investment slurry that is allowed to harden in the flask around the tree or set-up to form the mold. After the investment slurry is hardened, the patterns are melted out of the mold by heating in an oven, furnace or autoclave. The mold is then fired to an elevated temperature to remove water and burn off any residual pattern material in the casting cavities.

Conventional investment formulations used for nonferrous molds are comprised of a binder and a refractory made up of a blend of fine and course particles. A typical refractory usually is wholly or at least in part silica, such as quartz, cristabolite or tridymite. Other refractories such as calcined mullite and pyrophyllite also can be used as part of the refractory.

Gypsum powder (calcium sulfate hemihydrate) is almost universally used as a binder for molds intended for casting gold, silver and other metals and alloys having relatively low melting points. Casting of high melting point metals and alloys, such as platinum and platinum alloys, precludes the use of gypsum bonded investments. Instead, phosphate bonded investments have been and continue to be used to some extent for casting such metals. One type of phosphate investment generally comprises a refractory powder such as silica and a binder formed by reacting phosphate salts or phosphoric acid with a reactive oxide. Typically used phosphate investments generally utilize monoammonium phosphate and magnesium oxide with the latter being present in greater than the stoichiometric quantity required to react with the phosphate salt. Sometimes monomagnesium or monocalcium phosphate have been included to modify the performance of the investment. Illustrative examples of phosphate investments are disclosed in U.S. Pat. Nos. 2,072,212; 2,152,152; 2,209,035; 2,680,890 and 2,928,749.

Phosphate investments of the type described above, while known and available for many years, have not been completely satisfactory for platinum jewelry and efforts have been made by others to provide improved investments for this application. A recent development that has become commercially available consists essentially of silica ground to a relatively fine particle size which is mixed with dilute phosphoric acid. Phosphoric acid investment does not set up in a cementious manner like gypsum bonded investments. Since the investment does not set like a cement, the slurry is poured around the pattern cluster which is mounted on an absorbent surface within a metal flask. The flask is provided with a removable paper extension on its top so that the slurry can be higher than the top of the flask. The mold is then dried further, dewaxed and heated to prepare it for casting. The use of the absorbent surface under the flask permits the mold to dry from both the top and bottom surfaces.

Although the phosphoric acid type investments are capable of producing good castings with smooth surfaces, there are a number of objections to the use of phosphoric acid. It is a hazardous material and requires Hazmat packaging which increases shipping costs. In order to minimize this cost, the acid is usually provided at a high concentration, such as 50 to 85 percent phosphoric acid, which the customer must store, dilute and measure out as needed according to the supplier's specifications. The use of any additive which must be measured out and added to the mixing water, whether solid or liquid, and whether hazardous or not, requires additional in-plant operations and is a potential for mistakes. The use of a hazardous chemical has the additional disadvantage of adding to in-plant safety concerns. All of these disadvantages are particularly burdensome to users who purchase and use investment materials in small quantities.

SUMMARY OF THE INVENTION

It is an object of this invention to provide a phosphate investment material and methods of making phosphate investment molds which do not require the use of phosphoric acid with all of the attendant disadvantages discussed above.

Another object of the invention is to provide a composition and method for making a phosphate investment mold capable of casting high temperature melting metals and alloys, such as platinum and the like, with results which are superior or at least equivalent to those achieved by the use of the phosphoric acid type investments currently available.

According to one aspect of the invention, the foregoing objects and advantages are achieved by a dry investment powder blend comprising phosphate salt, water soluble organic acid and refractory powder.

According to another aspect of the invention, the foregoing objects and advantages are achieved by a method of making an investment mold comprising the steps of mixing refractory powder, phosphate salt, water soluble organic acid and water to form a slurry, investing a disposable pattern with the slurry, allowing the slurry to set to form a mold, and removing the disposable pattern from the mold. The refractory powder, phosphate salt and organic acid can be combined as a dry mixture which is thereafter mixed with water. Alternatively, at least one of the phosphate salt and acid can be added to the water with the refractory powder at the time of preparing the slurry.

The phosphate salt used in the composition and method of this invention is at least one member of the group consisting of phosphate salts of metals and inorganic, non-metallic cations, such as ammonium or boron. More particularly, the phosphate salt used in the composition and method of the invention may be at least one member of the group consisting of (a) monobasic, dibasic and tribasic phosphate salts, and (b) condensed polyphosphate salts. The preferred monobasic phosphate salts have the general formula $AH_2PO_4$ and $BH_4(PO_4)_2$ where A is ammonium or at least one monovalent member of the Group IA of the Periodic Table and B is a divalent metal. The preferred dibasic phosphate salts have the general formula $A_2HPO_4$ and $BHPO_4$ wherein A and B are as defined above. The preferred tribasic phosphate salts have the general formula $A_3PO_4$, $ABPO_4$, $B_3(PO_4)_2$ and $CPO_4$, where A and B are as previously defined and C is at least one trivalent element of Group III of the Periodic Table. In certain preferred compositions, B is at least one metal selected from Group IIA of the Periodic Table.

The condensed polyphosphate salt may be at least one member selected from the group consisting of pyrophosphates, long-chain polyphosphates and metaphosphates. All of the poly and metaphosphates are believed to be useful in the practice of this invention. Some suitable sodium metaphosphates are known by specific names such as Graham's, Maddrell's or Kurroll's salts.

Acids suitable for use in this invention are organic acids which melt above room temperature and are water soluble. Illustrative examples include oxalic, citric, adipic, malonic, glutonic, malic, maleic, and succinic acids.

A variety of refractories can be used in the composition and method of the invention, but, generally, natural silica in the form of quartz will be quite satisfactory and is preferred because of its ready availability and low cost. When higher refractoriness or increased inertness is desired or perhaps for other reasons, materials such as alumina, zircon, zirconia, high-alumina aluminum silicates, etc. can be used. Some lower thermal expansion alternatives to quartz tend to slide out of the metal flask on firing, but this can be prevented by crimping or otherwise altering the flasks. Alumina has the unexpected property of permitting water to move out of the investment into the porous supporting media more rapidly and it may be used by itself or as an additive to utilize this effect.

The useful range of ingredients in the compositions of the invention (based on the use of anhydrous salts and acids) is generally:

Phosphate Salt (0.02–4.00%)
Organic Acid (0.01–3.00%)
Refractory Powder-Balance
A more preferred range is:
Phosphate Salt (0.5–1.5%)
Organic Acid (0.25–1.25%)
Refractory Powder-Balance If any of the hydrated salts or acids are used, the upper limits can be increased to provide the equivalent amounts of anhydrous compounds.

Increasing the amount of organic acid beyond the ranges described is possible, but this increases the cost without commensurate advantages. Increasing the phosphate content similarly increases the cost and may have other disadvantages as well. For example, drying times and total cycle times are increased. Fired strength increases to unnecessary levels and, depending on the circumstances, may reach detrimental levels requiring excessively long shake-out times and/or excessive mechanical action harmful to delicate castings. In addition, increased phosphate content decreases permeability in the fired mold and increases the danger of defective castings.

The general procedure for using the investment material and method of the invention is the same as described above in connection with phosphoric acid type investments. The pattern cluster is placed on a water absorbent surface within the metal flask, and the flask is provided with a removable extension on its top so that the slurry can be poured higher than the top of the flask. Usually, a supematent layer of liquid does not occur with the new investment material of this invention. If it does form, the liquid on the top is decanted and, after further drying, the investment within the extension is cut-off even with the top of the flask. The mold is then dried further, dewaxed and fired to prepare it for casting.

These and other advantages and a fuller understanding of the invention will be had from the following detailed description.

DETAILED DESCRIPTION OF THE INVENTION

As generally described above, the invention provides an investment material formed from a novel dry investment powder blend containing one or more phosphate salts, one or more water soluble organic acids, and refractory powder. The investment powder is used to make solid investment molds suitable for casting platinum and other high melting temperature metals and alloys.

A considerable number of phosphate salts can be used in the practice of the invention. Generally, they fall into two broad categories: simple salts which can be formed by the partial or complete neutralization of phosphoric acid by a base of the desired cation; and more complex salts where the phosphate ions have undergone condensation reactions to eliminate water and form P—O—P linkages (one for each molecule of water eliminated).

The simple salts may be called monobasic, dibasic or tribasic, depending respectively on whether one, two or all three of the hydrogen ions and phosphoric acid were neutralized in their formation. They can be described further as follows:

1. Monobasic phosphate salts having the formulae $AH_2PO_4$ or $BH_4(PO_4)_2$. In these formulae A represents ammonium or a monovalent metal of Group IA of the Periodic Table and B represents a divalent metal of Group IIA of the Periodic Table, or other divalent metal such as zinc, for example.

2. Dibasic phosphate salts having the formulae $A_2HPO_4$ or $BHPO_4$, where A and B are defined as above.

3. Tribasic salts of the general formulae $A_3PO_4$, $ABPO_4$, $B_3(PO_4)_2$ or $CPO_4$, where C represents a trivalent element of Group III of the Periodic Table, and A and B are defined as above.

More complex, condensed polyphosphate salts are at least one member selected from the group consisting of pyrophosphates, long-chain polyphosphates and metaphosphates. All of the poly and meta phosphates are believed to be useful. Some suitable sodium metaphosphates are Graham's, Maddrell's or Kurroll's salts.

Acid suitable for use in the invention are organic acids which melt above room temperature and are water soluble. Illustrative examples include oxalic, citric, adipic, malonic, glutonic, malic, maleic, and succinic acids.

A variety of refractories can be used in the new investment material, but generally, natural silica in the form of quartz has been found quite satisfactory and is preferred because of its ready availability and low cost. When higher refractoriness or increased inertness is desired or perhaps for other reasons, such materials as alumina, zircon, zirconia, high-alumina aluminum silicates, etc. can be used. Some of the lower thermal expansion alternatives to quartz tend to slide out of the metal flasks on firing, but this is easily prevented by crimping or otherwise altering the flasks. Alumina has the unexpected property of permitting water to move out of the investment into porous media more rapidly, and it may be used by itself or as an additive to utilize this effect.

The useful range of ingredients in the compositions of the invention (based on the use of anhydrous salts and acids) is generally:

Phosphate Salt (one or more) 0.02–4.00%
Organic Acid (one or more) 0.01–3.00%
Refractory Powder-Balance
A more preferred range is:
Phosphate Salt (one or more) 0.5–1.5%
Organic Acid (one or more) 0.25–1.25%
Refractory Powder-Balance If any hydrated salts or acids are used, the upper limits expressed above can be increased to provide equivalent amounts of anhydrous compounds. Increasing the acids beyond the ranges indicated is feasible, but increases the cost with little or no commensurate advantages. Increasing the phosphate content similarly increases the cost, but has other disadvantages as well. For example, drying times and total cycle times increase. Fired strength increases to unnecessary levels and, depending upon the circumstances, may reach detrimental levels requiring excessively long shake-out times and/or excessive mechanical action which can be harmful to delicate castings. In addition, decreased permeability in the fired mold increases the danger of mis-run castings.

A paramount objective of the invention is to provide an investment material for high melting metals and alloys which does not require the use of phosphoric acid. Another important objective is to provide such an investment material which can be readily supplied as a powder ready to be used by simply mixing with water. In the event that the second objective is not important to a particular user, the invention contemplates adding the phosphate salts and/or organic acids to the mixing liquid at the time the slurry is prepared. It is also possible to add the salt either to the investment powder or to the mixing liquid with an organic acid in the form of a dilute, aqueous solution.

The large number of phosphate salts which can be used in carrying out the invention provides great flexibility in formulating the investment compositions. Salts containing calcium as the cation, especially $CaHPO_4$ and $Ca(H_2PO_4)_2$ are readily available and very satisfactory. $BaHPO_4$ produces rapid drying, but is more expensive and is not available from many sources. The use of $(NH_4)H_2PO_4$ provides the highest refractoriness in the mold by leaving no cation residue after firing. Alkaline metal phosphates, such as sodium and potassium, provide higher fired strength and can be used by themselves or in conjunction with other phosphate salts.

In carrying out the invention, the refractory slurry is invested around a pattern cluster supported in a flask on suitable water absorbent material in order to accomplish drying at the top and the bottom of the flask. The flask has an extension made of paper or the like on its top so that the slurry can be poured higher than the top of the flask. If a supernatant layer of liquid separates on the top, it is decanted and, after further drying, the investment, the paper is cut off even with the top of the flask. The mold is dried further, dewaxed and fired to prepare it for casting.

A single description of set-up and flasking; mixing and pouring; and initial air drying is applicable to all of the following specific examples of the invention and is as follows. The patterns and spruing which constitute the set-up are made of conventional jewelry casting waxes. The assembled set-up is attached at its sprue end directly to the absorbent medium in contrast to conventional jewelry casting where it is generally attached to a plate or base of rubber, wood, cardboard or metal. Suitable porous media used for the absorbent material are common paper towels, but it will be understood that many other items, such as filter paper, kitchen napkins, hand towels, wipers, blotting papers, etc. can be employed.

The paper towels are piled in a stack and the pattern set-up sprue is positioned within the casting flask and both the flask and the casting sprue are wax-welded to the top towel. Sufficient area is provided within the flask circle to permit ready movement of water from the investment slurry into the absorbent stack. Although the number of towels can be varied depending upon particular circumstances, a stack of ten was used in each of the following examples to provide uniformity. A flat piece of corrugated cardboard was used under the stack of towels for handling.

The flask used in each of the examples had a solid wall (no perforations) and no absorbent lining on the inside so as to provide a constant basis for comparing examples. However, it should be understood that drying times can be shortened somewhat by providing an absorbent liner on the inside wall of the flask and by providing perforated flask with their opening sealed by an absorbent paper on the outside. An extension formed by tape was provided on the top of each flask in order to accommodate the expansion of the refractory slurry under vacuum and to provide room for extra investment slurry that was subsequently trimmed off level with the top of the flask at an appropriate time in the drying cycle.

The phosphate salt, organic acid and refractory powder were pre-blended into a dry powder blend which was mixed with water as required. Distilled water was used in the examples. A common mixing procedure was employed with the exception that the mixing time was extended on a particular composition, if needed, in order to achieve desired final fluidity. Other than this variation, investing was similar to normal practice with other types of investment materials now in use.

The metal in the Examples 1–7 was a cobalt alloy having a melting point about 2715° F. The metal in Examples 8 and 9 was an 8620 steel alloy cast at a temperature of 3200° F. which is approximately the melting point of platinum alloys used for jewelry.

EXAMPLE 1

1.00% monomagnesium phosphate, dihydrate
0.25% oxalic acid, dihydrate
0.25% citric acid
98.50% silica The water to powder ratio was 27.5/100. At this ratio, the slurry was a thin mix and more fluid than needed. The slurry was invested in a flask which was initially dried for two and a half hours. It was then allowed to dry over the weekend for an additional 66.2 hours. After trimming the top extension, the flask was placed in an oven and dried at 250° F. for five hours and then transferred to a furnace for firing at 1600° F. The fired mold was found to be satisfactory in all respects in spite of the excessive water content and furnace cycle interruptions which occurred during firing.

A casting test was conducted with the same investment. The procedure was similar except that a more normal water to powder ratio of 26/100 was used. A three inch diameter by four inch high mold was dried overnight for seventeen hours and then fired for one hour at 1600° F. It was cast with cobalt 31 alloy at 2750° F. using the vacuum assist method. The resulting castings were good and exhibited smooth surfaces.

EXAMPLE 2

0.50% monobarium phosphate
0.02% oxalic acid
99.48% silica

The water to powder ratio was 28/100. After mixing, the invested mold was air dried at ambient conditions for 1.5 hours. It was then placed in an oven at 250° F. for 1.9 hours during which time the mold was removed briefly to trim the investment level even with the top of the flask. Following oven drying, the mold was placed in a furnace preheated to 500° F. and held for one-quarter hour. The furnace temperature was then raised to 1600° F. for 1.5 hours. The mold was soaked one additional hour at 1600° F. for a total cycle time of 5.6 hours after investing. It was cooled overnight in the furnace, and was found to be satisfactory. The total cycle time was short enough to permit investing and casting in one working day.

EXAMPLES 3 AND 4

1.0% sodium metaphosphate $(NaPO_3)_{13} \cdot Na_2O$.

1.0% oxalic acid, monohydrate 98.0% silica

This investment was mixed for use using a typical water powder ratio of 26/100 which is a typical water powder ratio for investments of this invention. The slurry exhibited good flow properties. A wax test pattern and sprue weighing 43 grams was invested in a three inch diameter by four inch high solid wall metal flask. It was allowed to dry overnight on the stack of paper towels at ambient conditions. The investment extending above the top of the flask was trimmed off even with the rim of the flask which was then transferred to an oven at 250° F. and dried for three hours, during which time the wax was also melted out of the mold. The mold was then transferred to a furnace at 500° F. and the temperature raised to 1600° F. with no interruptions for one hour. The furnace was then turned off and the mold allowed to cool in the furnace with the door closed. After firing and cooling it was found to be satisfactory in all respects.

For comparison purposes, a test on a similar investment was run without using oxalic acid in the mix. The mix composition was:

1.0% sodium metaphosphate $(NaPO_3)_{13} \cdot Na_2O$ 99.0% silica

With this composition, a flowable consistency with the water powder ratio of 26/100 could not be obtained. The slurry could not be used to fill a flask without additional water.

EXAMPLE 5

In a follow-up pair of tests, the same two investments as described above were run side-by-side. The oxalic acid-containing investment was run at the same 26/100 water powder ratio to serve as a control. The investment with no oxalic acid had its water/powder ratio increased to 34/100 in order to achieve the same consistency. The procedure was the same for both flasks and emulated that of the test described above. After investing, drying, firing and cooling, the investment containing oxalic acid was found to be completely satisfactory. The one without oxalic acid exhibited a number of serious problems. They included cracking on both exposed faces of the investment. A small chunk of investment spalled off the sprue end of the mold and the investment material partially deformed into the mold cavity to form a concave surface on the top which may have resulted from movement of the investment into the top of the mold cavity.

EXAMPLE 6

1.00% monocalcium phosphate 0.25% oxalic acid, dihydrate 98.75% silica

The water to powder ratio was 26/100. This composition was mixed with water as has been previously described and invested in a three inch diameter by four inch high flask. A mold firing test was run with a wax center sprue and sprue base having no attached patterns. The mold was dried at room temperature. Dull time was recorded at 3.0 hours. Drying was continued overnight for a total of 18.3 hours. At this time, the material above the top of the flask was trimmed off and the flask was placed in an oven at 250° F. for 1.5 hours. The oven temperature was then raised to 300° F. for one half hour. The flask was transferred to a furnace at 500° F. and the temperature raised to 1600° F. It was cooled in the furnace to room temperature for examination. There was some slight blistering on the top and bottom surfaces, but the rest of the mold, including the sprue and cavity area, was satisfactory.

Based on the foregoing result, a casting test was run on the same composition in a flask three inches in diameter by five inches high. A pattern set-up having wedding, signet and base ring patterns, was attached to the sprue. The latter ring type had a very complex and fine cage-like structure.

The procedure used was similar to the test previously described, except that the drying time at low temperature was extended at which time the mold was placed in a furnace at room temperature for firing. The mold was air dried in the furnace for 18.3 hours. The dull time occurred after the first 3.0 hours. The mold was heated at 250° F. for 4.8 hours and then transferred to a furnace at room temperature and fired for 2 hours at 1600° F. The mold was soaked for about 1.0 hour at this temperature and then cast in cobalt 31 alloy at 2775° F. by the vacuum assist method. After cooling to room temperature, it was observed that blistering on the top and bottom surfaces was eliminated. The ring castings produced in the mold were excellent.

EXAMPLE 7

1.00% monoammonium phosphate 0.25% oxalic acid, dihydrate 98.75% silica

The water powder ratio was 26/100. Mixing was carried out as previously described for 10 minutes total. The mix was very thick and was found to be thixotropic. The slurry was so slow pouring that filling of the flask had to be carried out manually by transferring lumps of the wet material from the mixing bowl into the flask, and vibrating it into place. The flask was three inches in diameter by four inches high and contained a pattern set-up that included rings.

A dull time was 4.25 hours, but the mold was allowed to stand for another 15.75 hours (or 20 hours total). The mold was then placed in an oven at 250° F. and cured for an additional 5 hours. The mold was transferred to a furnace and fired rapidly for about 2 hours to 1600° F. and held for approximately 1 hour. The mold was cast with cobalt alloy 31 at 2775° F. The castings were good.

EXAMPLE 8

1.00% monocalcium phosphate 0.25% malic acid 98.75% silica (quartz) 200 mesh

The liquid powder ratio was 26/100. The investment was mixed with water and used as described above. The wax cluster carried examples of wedding band, base ring, charm and finding patterns.

Unlike Examples 1 through 7, which were poured using solid-wall flasks, this example (and example 9 to follow) utilized a perforated flask. It was 3" in diameter, 4" high and perforated with 30 rows each having eleven ¼" diameter holes to allow water and/or water vapor to exit the mold in the lateral direction, as well as vertically through the top and bottom surfaces.

The flask was wrapped with five layers of paper towels held in place with some masking tape. It was attached with wax to a stack of five paper towels mounted on a cardboard base.

After the flask with its pattern cluster was invested, it was processed as follows:

Dried at ambient conditions (one hour).

Heated at 250° F., with the top collar and investment extension removed after the first 15 minutes (one hour).

Heated at 500° F. (one hour).

Fired rapidly to 1600° F. (30 minutes).

Heated at 1600° F. (one hour).

The mold at a temperature of 1600° F. was then cast in 8620 steel at 3200° F. using the vacuum-assist method.

The total processing time from the start of mixing the investment slurry to the pouring of the metal was 4.6 hours. The resulting castings were excellent.

EXAMPLE 9

1.00% monobarium phosphate 0.02% malic acid 98.98% silica (quartz) 200 mesh

The water powder ratio was 26/100. Mixing and pouring were the same as in earlier examples. The pattern cluster was similar to that of Example 8, except that it had a different selection of rings, a smaller number of findings and no charm pattern.

The flask and its wrapping were identical to that of Example 8. After investing, the mold was processed as follows:

Air dried for 30 minutes.

Dried at 250° F., with the top collar and investment extension removed after the first 15 minutes (one hour total).

Heated at 500° F. (one hour).

Heated rapidly to 1600° F. (30 minutes).

Held at 1600° F.

After one hour the mold appeared to be ready for casting. However, the casting furnace was not yet available, so it was held an additional 30 minutes (90 minutes total).

The mold at 1600° F. was then cast in 8620 steel at a metal temperature of 3200° F.

The total time from the start of mixing the slurry to casting was 4.75 hours, which included as one half hour unnecessary delay before casting. The resulting castings were excellent.

It will be apparent from the foregoing that the invention achieves the objective of providing a phosphate-type investment material and method capable of casting high melting point metals without using phosphoric acid as a binder. The new composition can be shipped and stored as a dry powder. Alternatively, one or more of the components can be added to the water at the time of mixing.

Variations and modifications of the disclosed invention will be apparent to those skilled in the art in light of the foregoing detailed disclosure. Therefore, it is to be understood that, within the scope of the appended claims, the invention can be practiced otherwise than as specially described.

What is claimed is:

1. A dry investment powder blend suitable for making investment molds consisting essentially of:

phosphate salt, water soluble organic acid, and at least one refractory powder selected from the group consisting of silica, alumina, zircon, zirconia and high alumina aluminum silicates.

2. A dry investment powder blend as claimed in claim 1 wherein said phosphate salt is at least one member of the group consisting of phosphate salts of metals and inorganic, nonmetallic cations.

3. A dry investment powder blend as claimed in claim 1 wherein said phosphate salt is at least one member of the group consisting of:

a) monobasic, dibasic, and tribasic simple phosphate salts, and b) condensed polyphosphate salts.

4. A dry investment powder blend as claimed 3 wherein:

a) said monobasic phosphate salts have the general formulae $AH_2PO_4$ and $BH_4(PO_4)_2$ where A is ammonium or at least one monovalent metal of Group IA of the Periodic Table and B is a divalent metal, b) said dibasic phosphate salts have the general formulae $A_2HPO_4$ and $BHPO_4$ wherein A and B are as defined above, and c) said tribasic phosphate salts have the general fomulae $A_3PO_4$, $ABPO_4$, $B_3(PO_4)_2$ and $CPO_4$ where A and B are as defined above and C is at least one trivalent element of Group III of the Periodic Table.

5. A dry investment powder blend as claimed in claim 4 wherein B is at least one metal selected from Group IIA of the Periodic Table.

6. A dry investment powder blend as claimed in anyone of claims 3, 4 or 5 wherein said condensed polyphosphate salt is at least one member selected from the group consisting of pyrophosphates, long-chain polyphosphates and metaphosphates.

7. A dry investment powder blend for making investment molds consisting essentially of:

a) from about 0.02–4.00% phosphate salt which is at least one member of the group consisting of monobasic, dibasic, tribasic and condensed polyphosphate salts, b) from about 0.01–3.00% of at least one water soluble organic acid having a melting point above room temperature, and c) the balance refractory powder, said refractory powder being at least one member selected from the group consisting of silica, alumina, zircon, zirconia, and high alumina aluminum silicates.

8. A dry investment powder blend as claimed in claim 7 wherein:

a) said monobasic phosphate salts have the general formulae $AH_2PO_4$ and $BH_4(PO_4)_2$ where A is ammonium or at least one monovalent metal of Group IA of the Periodic Table and B is a divalent metal, b) said dibasic phosphate salts have the general formulae $A_2HPO_4$ and $BHPO_4$ wherein A and B are as defined above, and c) said tribasic phosphate salts have the general fomulae $A_3PO_4$, $ABPO_4$, $B_3(PO_4)_2$ and $CPO_4$ where A and B are as defined above and C is at least one trivalent element of Group III of the Periodic Table.

9. A dry investment powder blend as claimed in claim 7 or claim 8 wherein said condensed polyphosphate salt is at least one member selected from the group consisting of pyrophosphates, long-chain polyphosphates and metaphosphates.

10. A method of making an investment mold comprising the steps of:

a) providing a slurry consisting essentially of a refractory powder, phosphate salt, water soluble organic acid and water, wherein the refractory powder is at least one member selected from the group consisting of silica, alumina, zircon, zirconia and high alumina aluminum silicates, b) investing a disposable pattern with the slurry, c) allowing the slurry to set to form a mold, and d) removing the disposable pattern from the mold.

11. The method as claimed in claim 10 wherein step a) is carried out by forming a dry mixture of the refractory powder, phosphate salt and organic add, and thereafter combining the dry mixture with the water.

12. The method as claimed in claimed in claim 10 wherein step a) is carried out by adding at least one of the phosphate salt and acid to the water and refractory powder at the time of preparing the slurry.

13. The method as claimed in claim 10 or claim 12 wherein step a) is carried out using dilute liquid organic acid.

14. The method as claimed in claim 10 wherein step a) is carried out by adding the phosphate salt to either the refractory powder prior to mixing or to the water, and the organic acid is used in the form of a dilute, aqueous solution.

15. The method as claimed in claim 10 wherein said phosphate salt is at least one member of the group consisting of:

a) monobasic, dibasic, and tribasic simple phosphate salts, and b) condensed polyphosphate salts.

16. The method as claimed in claim 15 wherein:

a) said monobasic phosphate salts have the general formulae $AH_2PO_4$ and $BH_4(PO_4)_2$ where A is ammonium or at least one monovalent metal of Group IA of the Periodic Table and B is a divalent metal, b) said dibasic phosphate salts have the general formulae $A_2HPO_4$ and $BHPO_4$ wherein A and B are as defined above, and c) said tribasic phosphate salts have the general fomulae $A_3PO_4$, $ABPO_4$, $B_3(PO_4)_2$ and $CPO_4$ where A and B are as defined above and C is at least one trivalent element of Group III of the Periodic Table.

17. The method as claimed in claim 15 or claim 16 wherein said condensed polyphosphate salt is at least one member selected from the group consisting of pyrophosphates, long-chain polyphosphates and metaphosphates.

* * * * *